Figure 1:
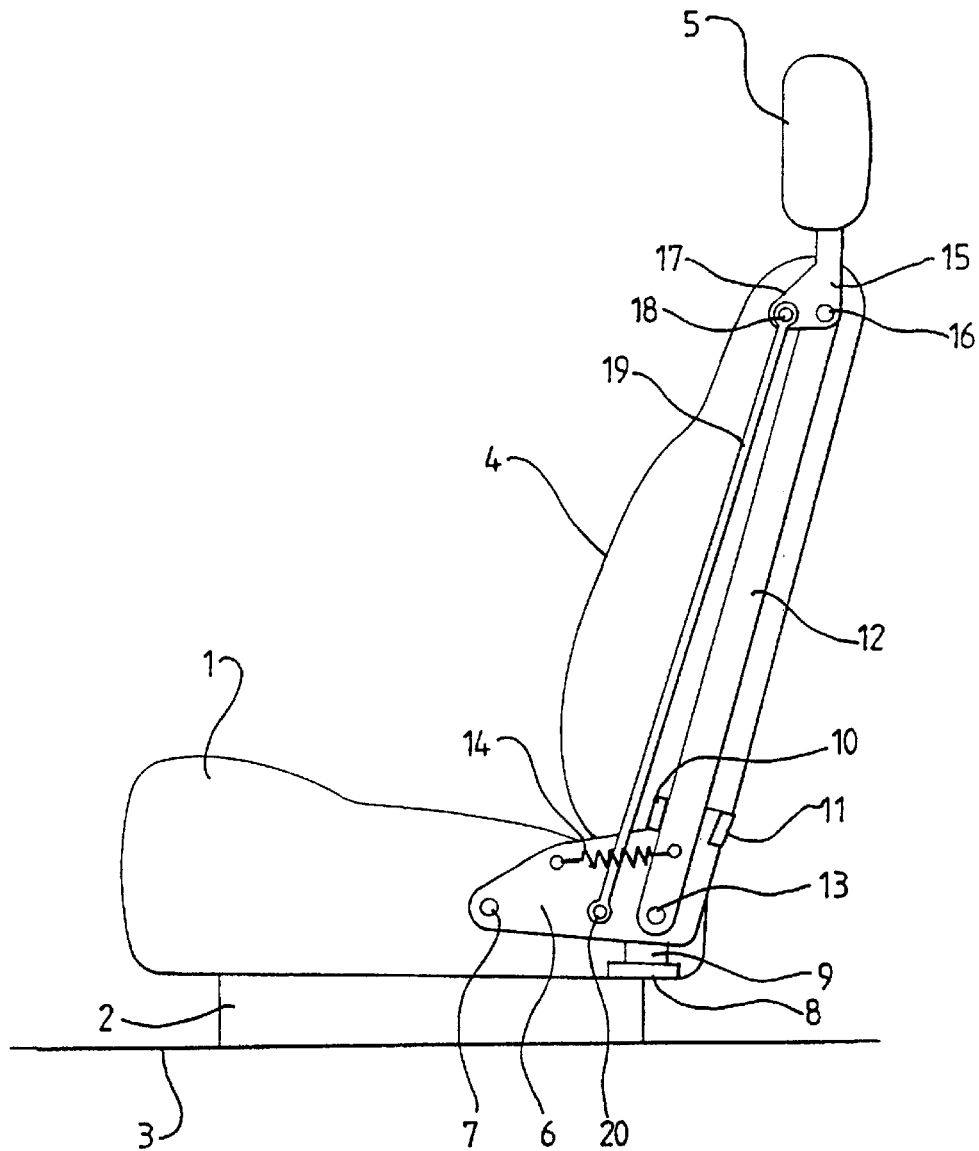

United States Patent
Håland et al.

[19]

[11] Patent Number: 6,050,637
[45] Date of Patent: Apr. 18, 2000

[54] SAFETY SEAT

[75] Inventors: Yngve Håland, Falsterbo; Sture Andersson, Nacka, both of Sweden

[73] Assignee: Autoliv Development AB, Vårgårda, Sweden

[21] Appl. No.: 09/254,396

[22] PCT Filed: Sep. 4, 1997

[86] PCT No.: PCT/SE97/01474

§ 371 Date: Jul. 15, 1999

§ 102(e) Date: Jul. 15, 1999

[87] PCT Pub. No.: WO98/09837

PCT Pub. Date: Mar. 12, 1998

[30] Foreign Application Priority Data

Sep. 6, 1996 [GB] United Kingdom .................. 9618672

[51] Int. Cl.⁷ ......................................................... B60N 2/42
[52] U.S. Cl. .................................. 297/216.14; 297/216.1
[58] Field of Search .......................... 297/216.1, 216.12, 297/216.13, 216.14

[56] References Cited

U.S. PATENT DOCUMENTS

| | | |
|---|---|---|
| 5,290,089 | 3/1994 | Oleszeko et al. .................... 297/216.1 |
| 5,306,073 | 4/1994 | Rees ..................................... 297/216.1 |
| 5,366,268 | 11/1994 | Miller et al. |
| 5,462,332 | 10/1995 | Payne et al. ......................... 297/216.1 |
| 5,597,205 | 1/1997 | Glance et al. ....................... 297/216.1 |

FOREIGN PATENT DOCUMENTS

| | | |
|---|---|---|
| 0 709 249 | 1/1996 | European Pat. Off. . |
| 28 20 564 | 11/1979 | Germany . |
| WO 95/11818 | 5/1995 | WIPO . |

*Primary Examiner*—Anthony D. Barfield
*Attorney, Agent, or Firm*—Venable; George H. Spencer; Robert Kinberg

[57] ABSTRACT

A safety seat for a motor vehicle has a squab (1) and a back (4). A support (6) is connected to the squab and the back is pivotally connected (13) to the support (6). A motion-restricting device (22) is provided in the form of a hydraulic damper which permits relative free movement of the back of the seat rearwardly until part (12) of the back of the seat engages a stop (11), but which resists any subsequent tendency for the back of the seat to move forwardly with a pivot movement about the pivot (13) away from the stop (11).

10 Claims, 4 Drawing Sheets

SAFETY SEAT

THE PRESENT INVENTION relates to a safety seat, and in particular, relates to a safety seat intended for use in a motor vehicle, such as a motor car.

It has been appreciated that if a motor vehicle, such as a motor car, is involved in a rear end collision, that is to say the following vehicle runs into the back of the car, the occupants of the struck car often suffer from neck injuries. Such injuries are commonly called "whiplash" injuries.

It is to be understood that during the rear-end collision of this type, the vehicle that is struck is subjected to a forward acceleration. This imparts a forward acceleration to the seats of the vehicle. The squab and back of each occupied seat engage the posterior and torso of the occupant of the seat and impart a substantial acceleration to the posterior and torso of the occupant. However, no corresponding acceleration is immediately imparted to the head of the occupant, as the head is not normally in contact with the seat, or with the head-rest that may be provided on the seat. The head is a part of the body that has substantial mass, and consequently the head has substantial inertia.

Thus, whilst the posterior and torso of the occupant of the vehicle are accelerated forwardly as a result of the rear-end collision, the head of the occupant of the vehicle initially remains stationary. This may cause the neck initially to adopt an "S"-shaped configuration as the lower part of the neck moves forwardly, whilst remaining vertical, and the upper part of the neck remains in its initial position. Subsequently, the head begins to rotate and the neck then occupies a curved configuration. The head subsequently moves forwardly. Research has shown that "whiplash" injuries may occur when the neck changes from the "S"-shaped configuration to the cured configuration at a substantial speed.

The present invention seeks to provide an improved vehicle seat in which the relative "whiplash" injuries occurring to the occupant of the seat during a rear-end collision are reduced.

According to this invention there is provided a safety seat for use in a motor vehicle, the safety seat comprising a squab; a back associated with the squab, the back being pivotally connected for pivotal movement relative to the squab, stop means being provided to limit rearward pivotal movement of the back, a motion restricting device being provided which relatively freely permits movement of the back of the seat rearwardly in a pivoting motion towards said stop, but which resists any subsequent tendency for the back of the seat to move forwardly with a pivotal motion away from the stop.

Preferably the motion restricting device comprises a hydraulic cylinder associated with a piston, the piston moving within the cylinder in response to movement of the back of the seat, the cylinder being associated with a fluid flow path which permits flow fluid in one sense through a non-return valve, so that the piston can move easily in one direction within the hydraulic cylinder, and which also permits fluid flow through a throttle, which permits the piston to move in the opposite sense in the cylinder, but against a throttling effect.

Conveniently the said back is mounted for pivot movement relative to support means, the said motion restricting device being adapted to restrict motion of the back relative to the support means, the support means being pivotally connected to the squab to permit movement of the support means, and the back, relative to the squab, without the motion restricting device being operative.

Advantageously resilient means are provided to resist the pivotal movement of the back rearwardly relative to the support means.

Preferably energy-absorbing means are provided to absorb energy when the support means pivot relative to the squab of the seat.

Conveniently the energy-absorbing means comprise a yieldable element located between the support means and a stop.

Advantageously when a force is applied to the seat back the seat back may execute a first movement, moving pivotally relative to the support means, against a relatively low resisting force, and a second subsequent movement, with the support means moving pivotally relative to the squab, against a relatively high resisting force.

Figure 2:
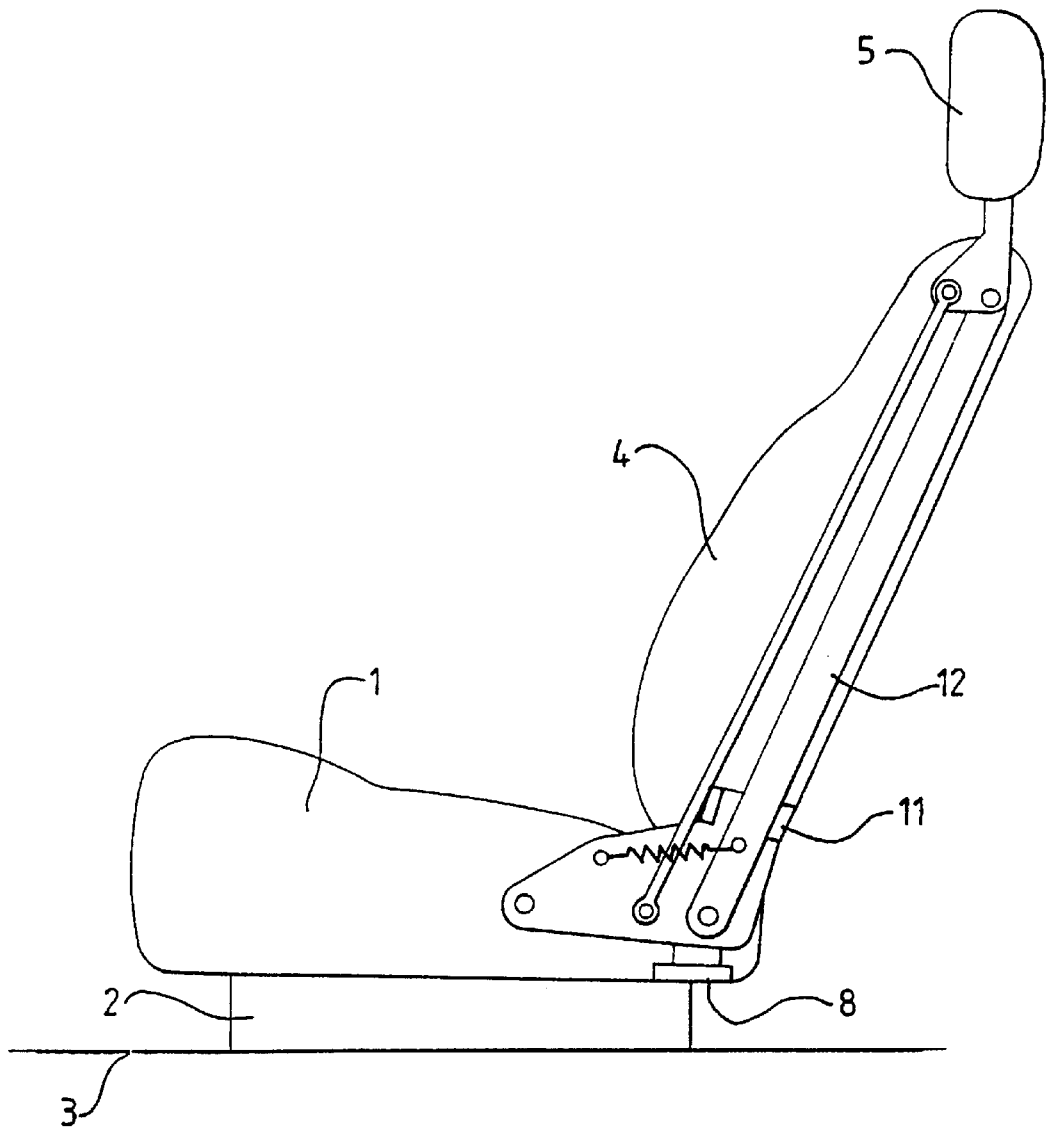
Figure 3:
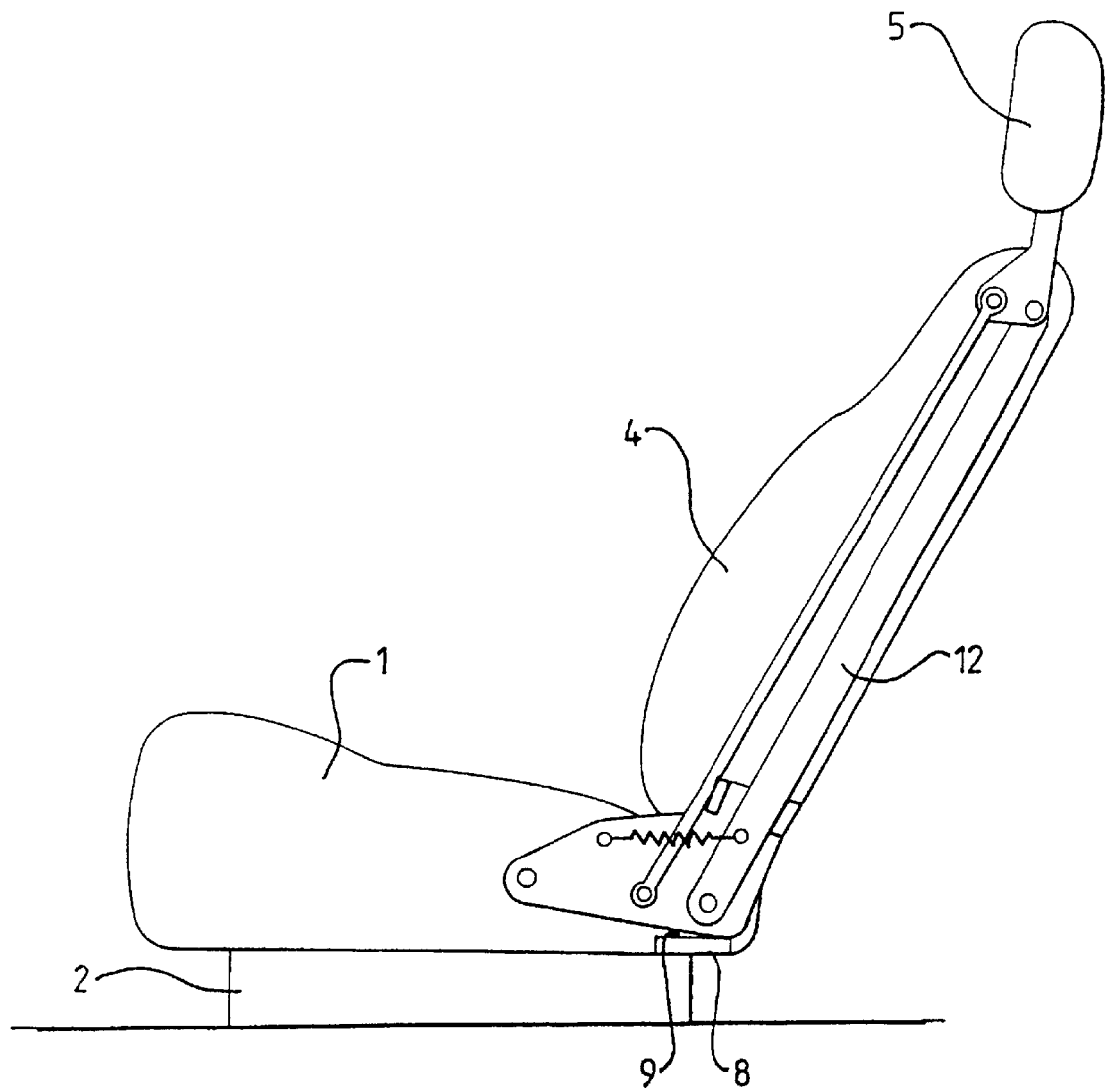
Figure 4:
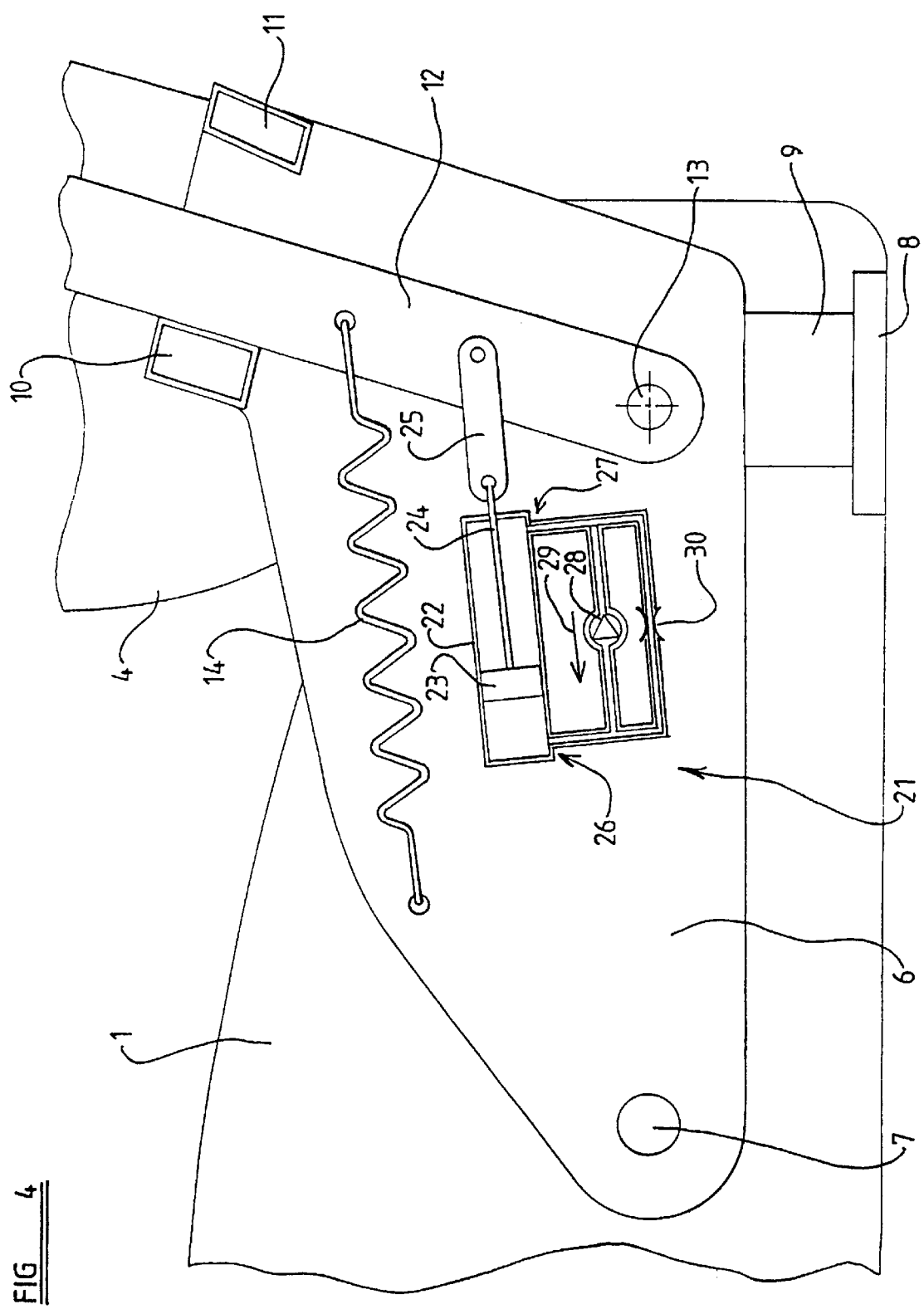

In order that the invention may be more readily understood, and so that further features thereof may be appreciated, the invention will now be described, by way of example, with reference to the accompanying drawings in which:

FIG. 1 is a diagrammatic side view of a seat in accordance with the invention in an initial condition, FIG. 2 is a view corresponding to FIG. 1 illustrating the seat in the second condition, FIG. 3 is a view corresponding to FIGS. 1 and 2 illustrating the seat in a further condition, and FIG. 4 is an enlarged view of part of the seat shown in FIG. 1.

Referring initially to FIG. 1, a safety-seat for use in a motor vehicle such as a motor car is illustrated. The seat comprises a squab 1 which is mounted on a support 2 which is carried by the floor 3 of the motor vehicle. A seat-back 4 is provided which is associated with the squab 1. A head-rest 5 is provided at the top part of the back 4, in a conventional position.

The squab 1 is associated with two support plates 6 (only one of which is shown). The support plates are mounted symmetrically on either side of the squab. Each support plate is of generally triangular form. A forwardly directed apex of each support plate 6 is pivotally connected to the squab 1 for pivoting motion about a pivot axis 7.

To co-operate with the support plate illustrated (and preferably also with the support plate which is not illustrated), a stop 8 is provided, towards the rear of the squab 1. A yieldable element 9 is provided which is located between the stop 8 and the rear part of the support plate 6. The yieldable element 9 may comprise an element formed of rubber or may comprise a compression spring. Preferably, the yieldable element may comprise a permanently deformable element, such as a thin-walled cylinder made of metal.

As will become clear from the following description, the yieldable element provides an energy-absorbing function.

The illustrated support plate 6 (and preferably also the support plate which is not illustrated) carries two stop elements 10,11 which are located respectively in front of and behind a seat back support strut 12. The lower end of the support strut 12 is pivotally connected to a support plate 6 for pivoting movement about a pivot axis 13. The seat-back support strut 12 is securely fastened to or forms part of the framework of the back 4 of the seat. Thus, the entire back of the seat is effectively supported by or on the seat back support strut 12 and can pivot about the pivot axis 13.

A spring 14 is provided, one end of which is connected to the seat-back support strut 12, the other end of which is connected to the support plate 6. The spring resists rearward pivoting motion of the back of the seat, but with a relatively low resistive force.

In alternative embodiments the spring 14 may be replaced by a resilient element such as a rubber or elastic strap.

In the illustrated embodiment, the head-rest 5 is provided with at least one support arm 15. Two support arms may be provided located on either side of the head-rest. One support arm 15 is illustrated. The support arm is pivotally connected, by a pivot 16 to the back of the seat 4. In the illustrated embodiment, the pivot 16 connects with the upper end of the seat back support strut 12.

The support arm 15 is provided with a forwardly projecting lug 17 which carries a pivotal connection 18 to a link arm 19. The link arm 19 extends substantially parallel with the seat back support strut 12, and the lower end of the link arm 19 is pivotally connected, at pivot point 20, to the support plate 6.

It is to be appreciated that the seat will initially have the condition illustrated in FIG. 1. The spring 14 serves to impart a forward bias or rotation to the seat back support strut 12 about a pivot axis 13, thus bringing the seat back support strut 12 into engagement with the forward stop 10 carried by the support plate 6.

In the event that a rear impact arises, whilst the seat is occupied, initially a forward acceleration is imparted to the squab 4 of the seat through the support 2. The person occupying the seat will, however, have inertia. As the squab of the seat moves forwardly, so the torso of the occupant of the seat will apply force to the back of the seat tending to cause the back of the seat initially to pivot rearwardly about the pivot axis 13. The back of the seat moves pivotally against the relatively low resisting force provided by the spring 14. Thus the back of the seat pivots in a rearward sense, against a restraining force provided by the spring 14. As can be seen from FIG. 2, the back of the seat moves to a position in which the seat back support strut engages the rear stop 11. The back of the seat thus effects a first rearward movement.

During this first rearward movement the effect of the link arm is such that the head-rest 5 pivots forwardly relative to the back of the seat about the axis defined by the pivot 16. Thus, the head-rest 5 effectively moves towards the head of the occupant of the seat, minimising the rearward distance that the head of the occupant of the seat travels before it engages the head-rest.

Since further rearward pivoting motion of the back of the seat 4 about the pivot axis 13 is prevented, as a consequence of engagement of the seat back support strut and the rear stop 11 carried by the support plate 16, subsequently, the back of the seat 4 pivots, together with the support plate 6, about the pivot axis 7, thus causing the yieldable element 9 to yield, the yieldable element 9 provides a relatively high resisting force which resists this second movement of the back of the seat. The seat is thus moved to the condition illustrated in FIG. 3.

It is to be appreciated that during this second movement of the back of the seat, because the movement is effected by a pivoting movement of the support plate about the pivot axis 7, there is no relative movement between the seat back support strut 12 and the link arm 19, meaning that during this second phase of movement of the back of the seat, there is no forward movement of the head-rest 5 relative to the back of the seat.

It will be understood that the back of the seat, in a rear impact situation, executes two movements, namely a first movement against a relatively low resisting force and a second movement against a greater resisting force.

During the first movement of the seat back the head-rest moves into contact with the head of the occupant. During the second movement, the head and the rest of the body move together, with no relative movement between the head and the rest of the body.

FIG. 4 illustrates a component present on the seat which has not been previously described. FIG. 4 illustrates the support plate 6, the pivot 7 and the lower part of the seat back support strut 12. The link arm 19 and the pivot 20 have been omitted for the sake of clarity of illustration.

The component illustrated in FIG. 4 comprises a motion restricting device 21 which permits movement of the back of the seat rearwardly in a pivoting motion about the pivot axis 13, but which restricts any subsequent tendency for the back of the seat to move forwardly with a pivotal motion about the pivot axis 13. It is to be understood that it is desired for the torso and head of the occupant of the vehicle to be accelerated, during a rear impact, to have a forward motion which is equivalent to the forward motion of the vehicle, in as smooth and uninterrupted manner as possible. Thus, as the back of the seat executes, the first movement and the second movement described above, the torso and the head of the occupant of the vehicle are being accelerated in a forward sense. It is to be understood that if the back of the seat should show any tendency of "bouncing" when the seat back support strut 12 engages the rearward stop 11 carried by the support plate 6, the occupant of the vehicle would be given a very substantial forward acceleration, which would be undesirable, since it would increase the role of "whiplash" injuries arising.

Thus, as can be seen in FIG. 4, a motion restricting device 21 is provided. The motion restricting device comprises a hydraulic cylinder 22 which is connected to the support plate 6. Contained within the cylinder 22 is a piston 23 which is connected by a piston rod 24 to a pivoting link 25 which is connected to the seat back support strut 12.

The hydraulic cylinder 22 is provided with two inlet/outlet ports 26,27 provided respectively at the opposed ends of the cylinder, the inlet/outlet ports 26,27 being interconnected by a parallel connection comprising firstly a non-return valve 28 which is adapted to permit a free flow of fluid in the direction indicated by the arrow 29 and secondly a constriction or throttle 30.

It will be understood, from considering FIG. 4, that as the seat back 4 moves rearwardly with the first movement in which the seat back support strut 12 moves pivotally about the pivot axis 13, the spring 14 will be extended and also the piston 23 will move towards the left within the hydraulic cylinder 22. Fluid will flow through the inlet/outlet port 27, and will readily flow through the non-return valve 28 in the direction of the arrow 29, thus re-entering the hydraulic cylinder through the inlet/outlet port 26. The piston 23 will thus move relatively freely within the hydraulic cylinder, without any substantial resistance to movement of the seat back support strut 12.

However, should the seat back support strut 12 show any tendency of bouncing forwardly, after having impacted on the rear stop 11 carried by the support plate 6, the piston 23 will tend to move towards the right within the hydraulic cylinder 22. Fluid will thus leave the hydraulic cylinder through the inlet/outlet port 26. The fluid will not be able to flow through the non-return valve 28, since the non-return valve 28 will operate to prevent fluid flow in that sense. The fluid will, however, be able to flow through the throttle or constriction 30. This means, however, that the motion restricting device 21 will provide a substantial hydraulic damping to any forward movement of the back support strut 12 of the seat. Consequently, there will be severe resistance to any forward motion of the back of the seat following the above-described first motion of the back of the seat during any accident situation.

It is to be understood, however, that the seat will return to its initial condition, as illustrated in FIG. 1, after a period of time, since the force exerted by the spring 14 on the seat back support strut 12 will tend to cause the seat back 4 to pivot forwardly relatively slowly with a flow of hydraulic fluid through the throttle or constriction 30.

What is claimed is:

1. A safety seat for use in a motor vehicle, the safety seat comprising a squab; a back associated with the squab, the back being pivotally connected for pivotal movement relative to the squab, stop means being provided to limit rearward pivotal movement of the back, a motion restricting device being provided which relatively freely permits movement of the back of the seat rearwardly in a pivoting motion towards said stop, in response to force applied to the back of the seat by the torso of the occupant of the seat as a consequence of a rear impact but which resists with substantial damping the subsequent tendency for the back of the seat to move forwardly with a pivotal motion away from the stop.

2. A seat according to claim 1 wherein the motion restricting device comprises a hydraulic cylinder associated with a piston, the piston moving within the cylinder in response to movement of the back of the seat, the cylinder being associated with a fluid flow path which permits flow fluid in one sense through a non-return valve, so that the piston can move easily in one direction within the hydraulic cylinder, and which also permits fluid flow through a throttle, which permits the piston to move in the opposite sense in the cylinder, but against a throttling effect.

3. A seat according to claim 1 wherein the said back is mounted for pivot movement relative to support means, the said motion restricting device being adapted to restrict motion of the back relative to the support means, the support means being pivotally connected to the squab to permit movement of the support means, and the back, relative to the squab, without the motion restricting device being operative.

4. A safety seat according to claim 3 wherein resilient means are provided to resist the pivotal movement of the back rearwardly relative to the support means.

5. A seat according to claim 3 wherein energy-absorbing means are provided to absorb energy when the support means pivot relative to the squab of the seat.

6. A seat according to claim 5 wherein the energy-absorbing means comprise a yieldable element located between the support means and a stop.

7. A seat according to claim 3 wherein when a force is applied to the seat back the seat back may execute a first movement, moving pivotally relative to the support means, against a relatively low resisting force, and a second subsequent movement, with the support means moving pivotally relative to the squab, against a relatively high resisting force.

8. A seat according to claim 3 wherein a head-rest is associated with the back; there being a linkage between the head-rest and the support means, the arrangement being such that the head-rest will be caused to pivot forwardly, relative to the back of the seat, when the back of the seat executes a pivoting motion relative to the support means, but the head-rest will remain in a substantially fixed position, relative to the back of the seat, when the support means, together with the back, pivot relative to the squab.

9. A seat according to claim 8 wherein the support means comprise at least one support plate provided on one side of the seat, the support plate being pivotally connected to the squab of the seat and the support plate being pivotally connected to an element associated with the back of the seat, the support plate carrying said stop means adapted to engage said element to limit pivotal movement of the element relative to the support plate both forwardly and rearwardly.

10. A seat according to claim 8, wherein the head-rest is carried by at least one support arm, the support arm being associated with pivot means, the support arm being mounted by a pivotal connection provided by said pivot means to the back of the seat and each support arm having projecting means, projecting from the said pivotal connection, the projecting means being associated with a link arm extending to the support means.

* * * * *